US011269396B2

(12) United States Patent
Ananthakrishnan et al.

(10) Patent No.: US 11,269,396 B2
(45) Date of Patent: Mar. 8, 2022

(54) PER-CORE OPERATING VOLTAGE AND/OR OPERATING FREQUENCY DETERMINATION BASED ON EFFECTIVE CORE UTILIZATION

(71) Applicant: Intel Corporation, Santa Clara, CA (US)

(72) Inventors: Avinash Ananthakrishnan, Portland, OR (US); Stephen Gunther, Beaverton, OR (US); Amr Muhammad Lotfy El-Sayed, Hillsboro, OR (US); Akshay Parnami, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 87 days.

(21) Appl. No.: 16/147,285

(22) Filed: Sep. 28, 2018

(65) Prior Publication Data
US 2019/0041962 A1 Feb. 7, 2019

(51) Int. Cl.
G06F 1/3234 (2019.01)
G06F 1/3296 (2019.01)
G06F 1/3228 (2019.01)
G06F 1/324 (2019.01)

(52) U.S. Cl.
CPC ............ *G06F 1/3243* (2013.01); *G06F 1/324* (2013.01); *G06F 1/3228* (2013.01); *G06F 1/3296* (2013.01)

(58) Field of Classification Search
CPC ...... G06F 1/3243; G06F 1/3228; G06F 1/324; G06F 1/3296
See application file for complete search history.

(56) References Cited

U.S. PATENT DOCUMENTS

| 6,711,447 | B1 | 3/2004 | Saeed |
| 8,943,334 | B2 | 1/2015 | Kumar et al. |
| 2008/0148027 | A1 | 6/2008 | Fenger et al. |
| 2008/0162868 | A1* | 7/2008 | Glew .................. G06F 12/1027 711/203 |
| 2009/0089792 | A1* | 4/2009 | Johnson ................ G06F 9/4881 718/105 |
| 2010/0332856 | A1 | 12/2010 | Song |

(Continued)

FOREIGN PATENT DOCUMENTS

WO 2012040052 3/2012

OTHER PUBLICATIONS

Intel 64 and IA-32 Architectures Software Developer's Manual, Sep. 2016, Intel Corporation, vol. 3B: System Programming Guide, Part 2. (Year: 2016).*

(Continued)

*Primary Examiner* — Jaweed A Abbaszadeh
*Assistant Examiner* — Hyun Soo Kim
(74) *Attorney, Agent, or Firm* — Schwabe, Williamson & Wyatt, P.C.

(57) ABSTRACT

An apparatus is provided, where the apparatus includes a plurality of processing cores to execute a plurality of processes, a register to store an indicator that is to indicate a preference for either performance or energy efficiency, a first circuitry to determine an effective utilization of a first processing core, based on the indicator, and a second circuitry to select at least one of an operating voltage or an operating frequency of the first processing core, based at least in part on the effective utilization of the first processing core.

18 Claims, 11 Drawing Sheets

(56) References Cited

U.S. PATENT DOCUMENTS

| | | | | |
|---|---|---|---|---|
| 2011/0113220 A1* | 5/2011 | Morishita | ............ | G06F 9/3009 |
| | | | | 712/30 |
| 2011/0283286 A1* | 11/2011 | Wu | ........................ | G06F 1/329 |
| | | | | 718/103 |
| 2014/0053009 A1* | 2/2014 | Semin | ................. | G06F 9/30083 |
| | | | | 713/322 |
| 2014/0068284 A1* | 3/2014 | Bhandaru | ............. | G06F 1/3296 |
| | | | | 713/300 |
| 2015/0355800 A1* | 12/2015 | Cronin | .................. | G06F 3/0484 |
| | | | | 715/835 |
| 2018/0060123 A1* | 3/2018 | Weissmann | ........... | G06F 9/5027 |
| 2018/0120920 A1* | 5/2018 | Iyigun | ................... | G06F 1/3243 |
| 2018/0129534 A1* | 5/2018 | Iyigun | ................... | G06F 9/4881 |
| 2019/0004585 A1* | 1/2019 | Halverson | ............ | G06F 1/3206 |
| 2019/0041962 A1 | 2/2019 | Ananthakrishnan et al. | | |

OTHER PUBLICATIONS

International Search Report and Written Opinion from PCT/US2019/039342 notified Oct. 18, 2019, 14 pgs.

\* cited by examiner

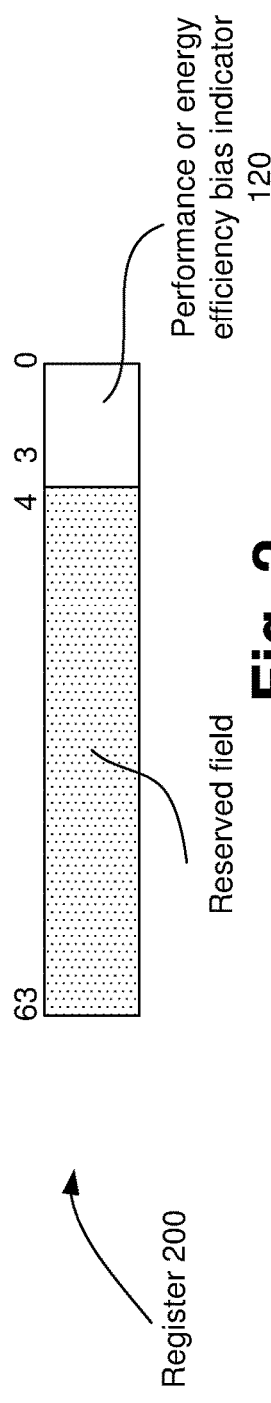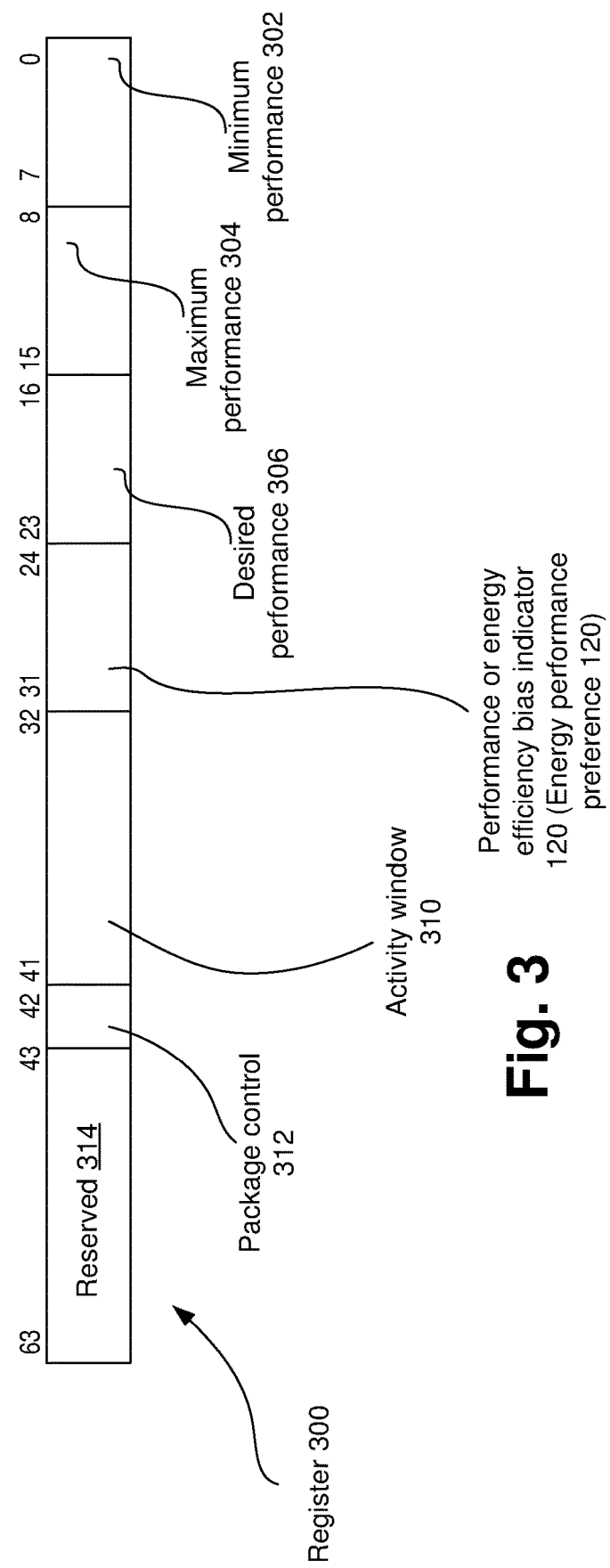

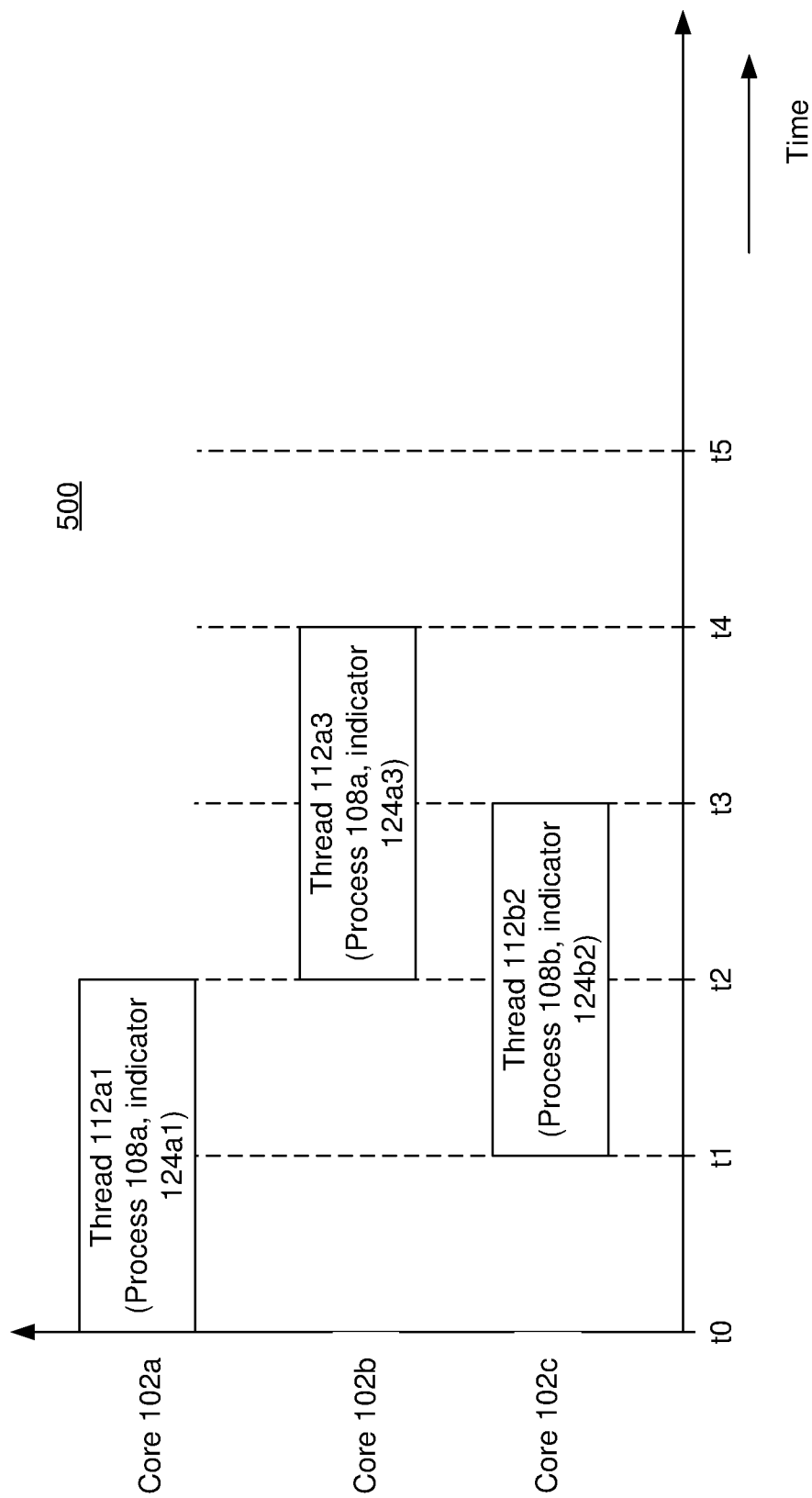

600

```
process_c0_residency = { }
thread_c0_residency = { }
pkg_C0_residency = { }
LRU_process = { }
Process_count = 8  # Let's say we want to keep stats for upto 8 unique process IDs.

MAX_THREAD_COUNT = 8  # 8 threads for example
for _thread in range (0, MAXTHREAD_COUNT) :
    thread_hwp_req = readIo(IA32_HWP_REQUEST[_thread])
    process_id = thread_hwp_req.Logical_Process_Identifier
    c0_residency_current = readIO(C0_RESIDENCY_MSR)  # Get the C0 residency for that thread
    c0_residency_delta = C0_residency - C0_residency_last
    C0_residence_last = C0_residency_current
    thread_C0_residency[_thread] += C0_residency_delta If (process_id in process_C0_residency.keys():
    process_C0_residency[process_id] += C0_residency_delta
Else:
    # New process_ID from the OS. Check to see if we want to add it to the stats.
    If (len(LRU_process) < MAX_PROCESS_COYNT):
        LRU_process[process_id] = current_tsc
    else:
        # check to see the process_id that's the oldest – discard it and replace it with a new process_id that we want to track
        oldest_tsc = sorted(LRU_process.values())[-1]  #Get the process with the oldest TSC
        process_id_to_remove = [key for key, value in LRU_process.iteritems( ) If value == Oldest_tsc][0]
        #Remove the oldest process_id from history to make way for a new process_id
        delete(process_C0_residency[process_id_to_remove])
        #Add the new process_id's data to our history
        process_C0_residency[process_id] = C0_residency_delta pkg_C0_residence += C0_residency_delta
```

For each core :
  If ("Performance or energy efficiency bias indicator 120" == Performance):
    Effective_utilization[core] = process_utilization of a process being executed in the core
  Else:
    Effective_utilization[core] = Core_utilization[core_id]

For each core :
  If ("Performance or energy efficiency bias indicator 120" == Performance):
    Effective_utilization[core] = package utilization
  Else:
    Effective_utilization[core] = Core_utilization[core_id]

Fig. 7B

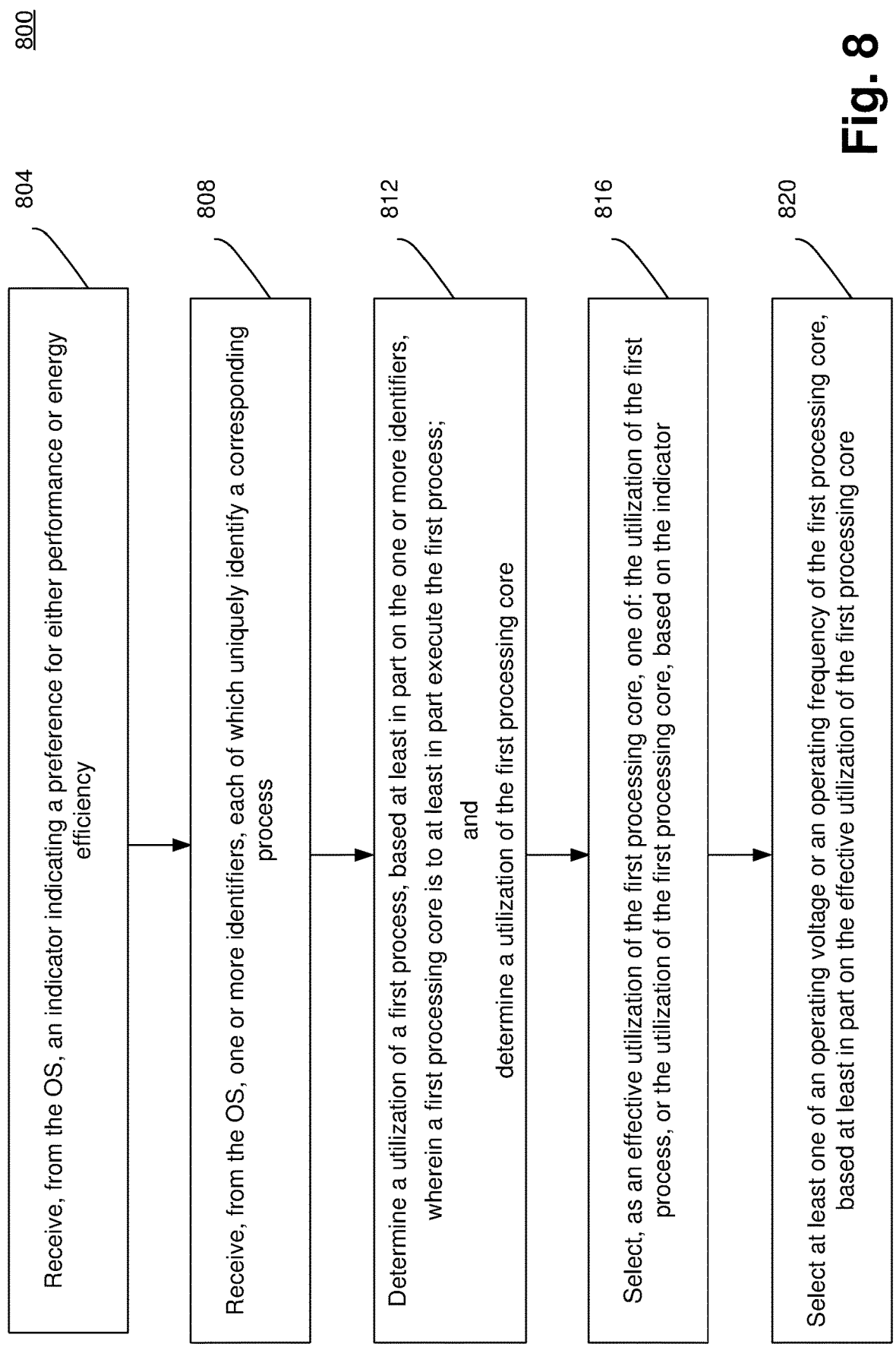

PER-CORE OPERATING VOLTAGE AND/OR OPERATING FREQUENCY DETERMINATION BASED ON EFFECTIVE CORE UTILIZATION

BACKGROUND

A trend in modern computing is to integrate an increasing number of processing cores, to deliver more throughput performance. As more and more cores get integrated, e.g., to increase overall performance and efficiency, it may be useful and/or possible to run each of the cores on corresponding independent voltage and/frequency domains. Different algorithms have been developed over the years on how to pick a frequency and/or a voltage (e.g., a power state, such as a P-state) for individual cores to operate. These algorithms have looked at various factors, e.g., to select a frequency to run the cores.

A thread in computer science is short for a thread of execution. Threads are a way for a program or process to divide or split itself into two or more simultaneously (or pseudo-simultaneously) running tasks. In an example, workloads of computing devices are threaded, and there may be multiple processes concurrently running on a processing core. A duration for which a process gets scheduled on a core has material impact on performance of the process and/or the core. It may be desirable to develop ways to select voltage and/or frequency (e.g., select a power state, such as a P-state that is in accordance with the ACPI (Advanced Configuration and Power Interface) specification) for a core to operate, e.g., based on the threads being executed on the core.

BRIEF DESCRIPTION OF THE DRAWINGS

The material described herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements. In the figures:

FIG. 2 illustrates an example register that stores the performance or energy efficiency bias indicator, according to some embodiments.

FIG. 3 illustrates another example register that stores the performance or energy efficiency bias indicator, according to some embodiments.

FIG. 5 illustrates a graph illustrates example processing cores executing various threads, according to some embodiments.

FIG. 6 illustrates an example pseudo-code for determining a process_C0_residency, a thread_C0_residency, and a package_C0_residency, according to some embodiments.

FIG. 7A illustrates an example pseudo-code for determining an effective core utilization of a core, based on the "Performance or energy efficiency bias indicator" of FIG. 1A, according to some embodiments.

FIG. 7B illustrates another example pseudo-code for determining an effective core utilization of a core, based on the "Performance or energy efficiency bias indicator" of FIG. 1A, according to some embodiments.

FIG. 8 illustrates a flowchart depicting a method for assigning operating voltage and/or operating frequency to individual cores of the system of FIG. 1A, according to some embodiments.

DETAILED DESCRIPTION

Figure 1A:
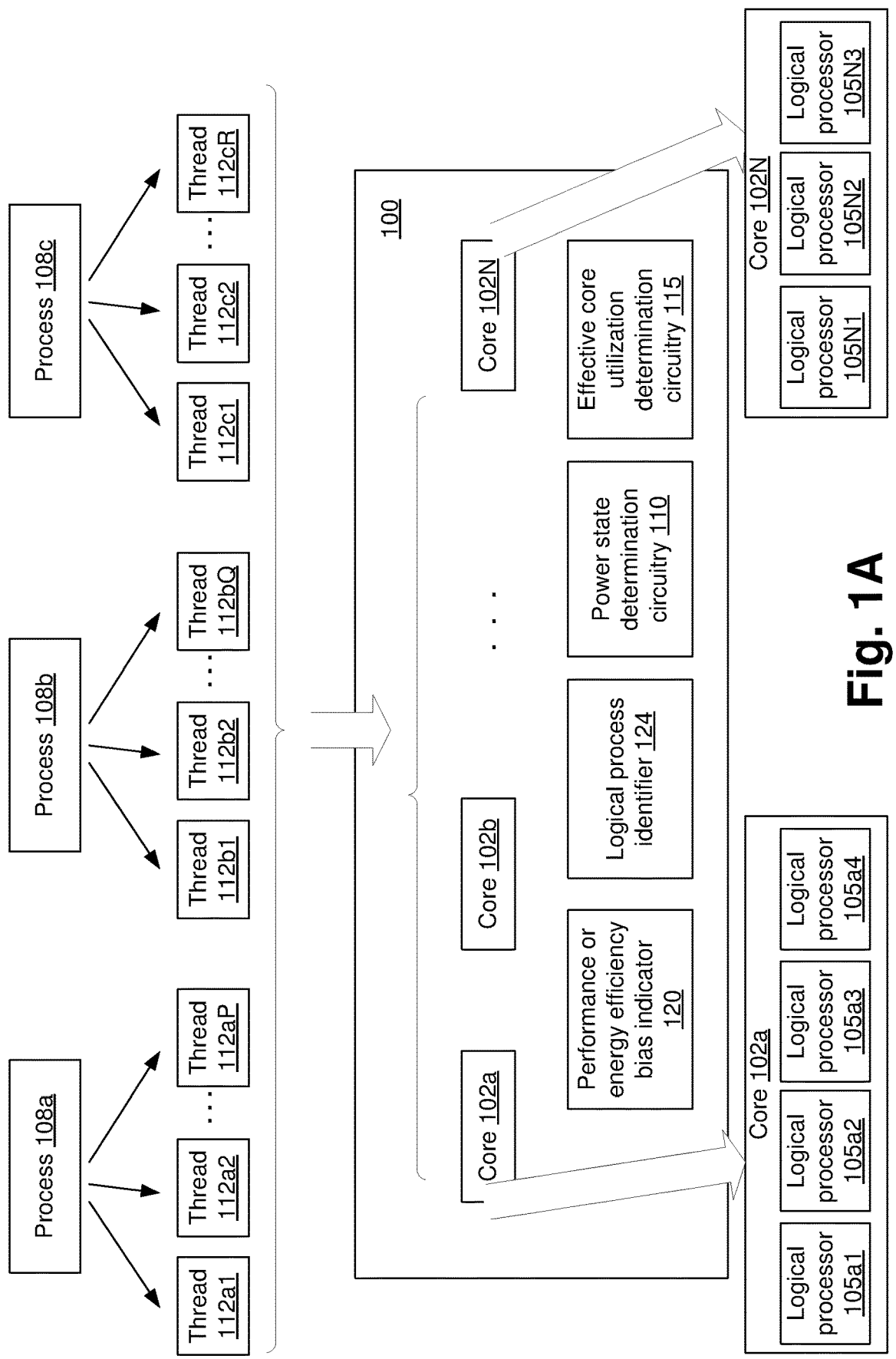
FIG. 1A schematically illustrates a computing device that determines operating states of processing cores, based on a "performance or energy efficiency bias indicator" and an "effective core utilization", according to some embodiments.

In a computing device, power state selection circuitries usually take into account a utilization of a processing core (e.g., residence of the processing core at active state or C0 state, also referred to as core utilization), and implement a controller (e.g., a proportional controller, a Proportional-Integral-Derivative (PID) controller, etc.) that selects a power state (e.g., a frequency and/or a voltage, where P-state is an example of a power state) as a function of the core utilization. For example, the higher the core utilization, the more work that needs to be done by the core, and hence higher the selection of the operating frequency of the core. For example, the PID controller takes historical core utilization into account (e.g., the integral component of PID), and also modulate the frequency recommendation based on the rate of change of the core utilization (e.g., derivative component of PID).

In modern computing devices, a process may spawn or generate multiple logical processes or threads, and multiple threads may be executed in parallel in multiple processing cores. Thread migration refers to migration of a thread (or a process) from one processing core to another during execution. A process utilization refers to a utilization or active C0 residency time of a process, e.g., over the multiple threads the process generates.

With thread migration, as the workload moves from core to core, the core utilization of a specific core may be less than the process utilization. Merely as a simple example, a process may spend 50% time on a first core and 50% time on a second core—in such an example, the core utilization of each of the first and second cores is 50%, but the process utilization is 100%. In a conventional P-state selection that is done at a per core granularity based on core utilization, for this example, the P-state selection is done assuming merely a 50% core utilization, thereby leading to a selection of a relatively lower value of operational frequency for each of the processing cores.

However, if the process were to run solely on the first core, then the core utilization would have been 100%—this would have resulted in a selection of a relatively high value of operational frequency for the first core.

Thus, power state selection based solely on core utilization may not take into account migration of threads over multiple cores, may result in sub-optimal performance.

In some embodiments and as will be discussed in further details herein, an "effective core utilization" (e.g., an "effective utilization" of a processing core) is taken into account while selecting a power state (such as a P-state having a specific voltage and/or frequency) for a processing core. The effective core utilization can be either the actual core utilization, or the process utilization.

It is to be noted that some examples and embodiments discussed in this disclosure refers specifically to P-state, where a P-state may be in accordance with the ACPI (Advanced Configuration and Power Interface) standard. However, the scope of this disclosure is not limited by merely P-state determination in accordance with the ACPI standard. For example, the principles of this disclosure may generally be applied to determining operating voltage and/or operating frequency, which may, or may not, be in accordance with P-states. Thus, any reference to P-states are for merely example purposes and for not limiting the scope of this disclosure. Any specific reference to a P-state determination for a core may also generally apply to determination of an operating voltage and/or frequency for the core.

In an example, an indicator associated with a process (or associated with individual threads of a process) may indicate either a preference for higher performance, or a preference for energy savings (e.g., a preference for low power). If the indicator indicates a preference for higher performance, the effective core utilization is equal to the process utilization. However, if the indicator indicates a preference for energy savings, the effective core utilization is equal to the core utilization.

The power state selection algorithm is then executed based on the effective core utilization, e.g., instead of being based on the actual core utilization. Thus, for example, if a process is migrating between two cores and assuming that the indicator indicates a preference for higher performance, the effective core utilization for the process is based on the total or overall utilization of the process over the two cores. This results in a frequency selection that is based on the process utilization, and not on the core utilization. On the other hand, if energy savings is a concern, the frequency selection is based on the core utilization (e.g., as in such a case, the effective core utilization would be equal to the actual core utilization). Thus, the embodiments result in better selection of frequency, thereby resulting in enhanced performance or enhanced energy savings, as desired. Other technical effects will be evident from the various embodiments and figures.

One or more embodiments are described with reference to the enclosed figures. While specific configurations and arrangements are depicted and discussed in detail, it should be understood that this is done for illustrative purposes only. Persons skilled in the relevant art will recognize that other configurations and arrangements are possible without departing from the spirit and scope of the description. It will be apparent to those skilled in the relevant art that techniques and/or arrangements described herein may be employed in a variety of other systems and applications other than what is described in detail herein.

Reference is made in the following detailed description to the accompanying drawings, which form a part hereof and illustrate exemplary embodiments. Further, it is to be understood that other embodiments may be utilized and structural and/or logical changes may be made without departing from the scope of claimed subject matter. It should also be noted that directions and references, for example, up, down, top, bottom, and so on, may be used merely to facilitate the description of features in the drawings. Therefore, the following detailed description is not to be taken in a limiting sense and the scope of claimed subject matter is defined solely by the appended claims and their equivalents.

In the following description, numerous details are set forth. However, it will be apparent to one skilled in the art, that the present invention may be practiced without these specific details. In some instances, well-known methods and devices are shown in block diagram form, rather than in detail, to avoid obscuring the present invention. Reference throughout this specification to "an embodiment" or "one embodiment" or "some embodiments" means that a particular feature, structure, function, or characteristic described in connection with the embodiment is included in at least one embodiment of the invention. Thus, the appearances of the phrase "in an embodiment" or "in one embodiment" or "some embodiments" in various places throughout this specification are not necessarily referring to the same embodiment of the invention. Furthermore, the particular features, structures, functions, or characteristics may be combined in any suitable manner in one or more embodiments. For example, a first embodiment may be combined with a second embodiment anywhere the particular features, structures, functions, or characteristics associated with the two embodiments are not mutually exclusive.

As used in the description and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items.

The terms "coupled" and "connected," along with their derivatives, may be used herein to describe functional or structural relationships between components. It should be understood that these terms are not intended as synonyms for each other. Rather, in particular embodiments, "connected" may be used to indicate that two or more elements are in direct physical, optical, or electrical contact with each other. "Coupled" may be used to indicated that two or more elements are in either direct or indirect (with other intervening elements between them) physical or electrical contact with each other, and/or that the two or more elements co-operate or interact with each other (e.g., as in a cause an effect relationship).

The terms "substantially," "close," "approximately," "near," and "about," generally refer to being within +/−10% of a target value. For example, unless otherwise specified in the explicit context of their use, the terms "substantially equal," "about equal" and "approximately equal" mean that there is no more than incidental variation between among things so described. In the art, such variation is typically no more than +/−10% of a predetermined target value.

The term "scaling" generally refers to converting a design (schematic and layout) from one process technology to another process technology and subsequently being reduced in layout area. The term "scaling" generally also refers to downsizing layout and devices within the same technology node. The term "scaling" may also refer to adjusting (e.g., slowing down or speeding up—i.e. scaling down, or scaling up respectively) of a signal frequency relative to another parameter, for example, power supply level.

As used throughout this description, and in the claims, a list of items joined by the term "at least one of" or "one or more of" can mean any combination of the listed terms. For example, the phrase "at least one of A, B or C" can mean A; B; C; A and B; A and C; B and C; or A, B and C.

The terms "left," "right," "front," "back," "top," "bottom," "over," "under," and the like in the description and in the claims, if any, are used for descriptive purposes and not necessarily for describing permanent relative positions. For example, the terms "over," "under," "front side," "back side," "top," "bottom," "over," "under," and "on" as used herein refer to a relative position of one component, structure, or material with respect to other referenced components, structures or materials within a device, where such physical relationships are noteworthy. These terms are employed herein for descriptive purposes only and predominantly within the context of a device z-axis and therefore may be relative to an orientation of a device. Hence, a first material "over" a second material in the context of a figure provided herein may also be "under" the second material if the device is oriented upside-down relative to the context of the figure provided. In the context of materials, one material disposed over or under another may be directly in contact or may have one or more intervening materials. Moreover, one material disposed between two materials may be directly in contact with the two layers or may have one or more intervening layers. In contrast, a first material "on" a second material is in direct contact with that second material. Similar distinctions are to be made in the context of component assemblies.

The term "between" may be employed in the context of the z-axis, x-axis or y-axis of a device. A material that is between two other materials may be in contact with one or both of those materials, or it may be separated from both of the other two materials by one or more intervening materials. A material "between" two other materials may therefore be in contact with either of the other two materials, or it may be coupled to the other two materials through an intervening material. A device that is between two other devices may be directly connected to one or both of those devices, or it may be separated from both of the other two devices by one or more intervening devices.

It is pointed out that those elements of the figures having the same reference numbers (or names) as the elements of any other figure can operate or function in any manner similar to that described, but are not limited to such.

FIG. 1A schematically illustrates a computing device 100 (also referred to as device 100) that determines operating states of processing cores, based on a "performance or energy efficiency bias indicator 120" (also referred to as indicator 120) and an "effective core utilization" (e.g., as determined by an "Effective core utilization determination circuitry 115"), according to some embodiments. The device 100 comprises processing cores (also referred to as cores) 102a, 102b, . . . , 102N. Thus, there may be N number of cores, where N may be an appropriate integer. As will be discussed in further details herein later, the device 100 comprises a logical process identifier 124 and a power state determination circuitry 110.

Elements referred to herein with a common reference label followed by a particular number or alphabet may be collectively referred to by the reference label alone. For example, cores 102a, 102b, . . . , 102N may be collectively and generally referred to as cores 102 in plural, and core 102 in singular.

Illustrated in FIG. 1A are various examples processes 108a, 108b, 108c executed by the cores 102. Although merely three processes 108 are illustrated, any other appropriate number of processes may be executed by the cores 102. Individual process of the processes 108a, 108b, 108c may represent any appropriate process or program (e.g., a Microsoft Word® program) being executed in the device 100.

In an example, individual processes may spawn or generate multiple threads. Threads are a way for a process to divide or split itself into two or more simultaneously (or pseudo-simultaneously) running tasks. For example, the process 108a may spawn threads 112a1, 112a2, . . . , 112aP, e.g., P number of threads, where P is an appropriate integer. The process 108b may spawn threads 112b1, 112b2, . . . , 112bQ, e.g., Q number of threads, where Q is an appropriate integer. The process 108c may spawn threads 112c1, 112c2, . . . , 112cR, e.g., R number of threads, where R is an appropriate integer.

In an example, a physical processing core 102 (e.g., which is a physical processing core of the device 100) may implement one or more logical processors 105. Merely as an example, the core 102a is illustrated to execute logical processors 105a1, 105a2, 105a3, 105a4, and the core 102N is illustrated to execute logical processors 105N1, 105N2, 105N3. A number of logical processors being formed by a corresponding physical core 102 (e.g., four logical processors being formed by core 102a), as illustrated in FIG. 1A, is merely an example, and do not limit the scope of this disclosure. Although not illustrated, other cores (e.g., core 102b) may also form one or more logical processors.

Threads 112 of a specific process 108 may be executed by a core 102, or by more than one core. A logical processor 105 may execute a thread 112. A logical process refers to a thread 112 scheduled on a logical processor 105. The terms logical process and thread may be used interchangeably in this disclosure.

Thread migration refers to a scenario where a thread (or process) being executed in a core moves to another core. For example, the thread 112a1 may initially be executed by logical processor 105a1 of the core 102a, and then by the logical processor 105N1 of the core 102N. The migration of the thread 112a1 (or the parent process 108a) from the core 102a to the core 102N is referred to as thread migration.

Figure 1B:
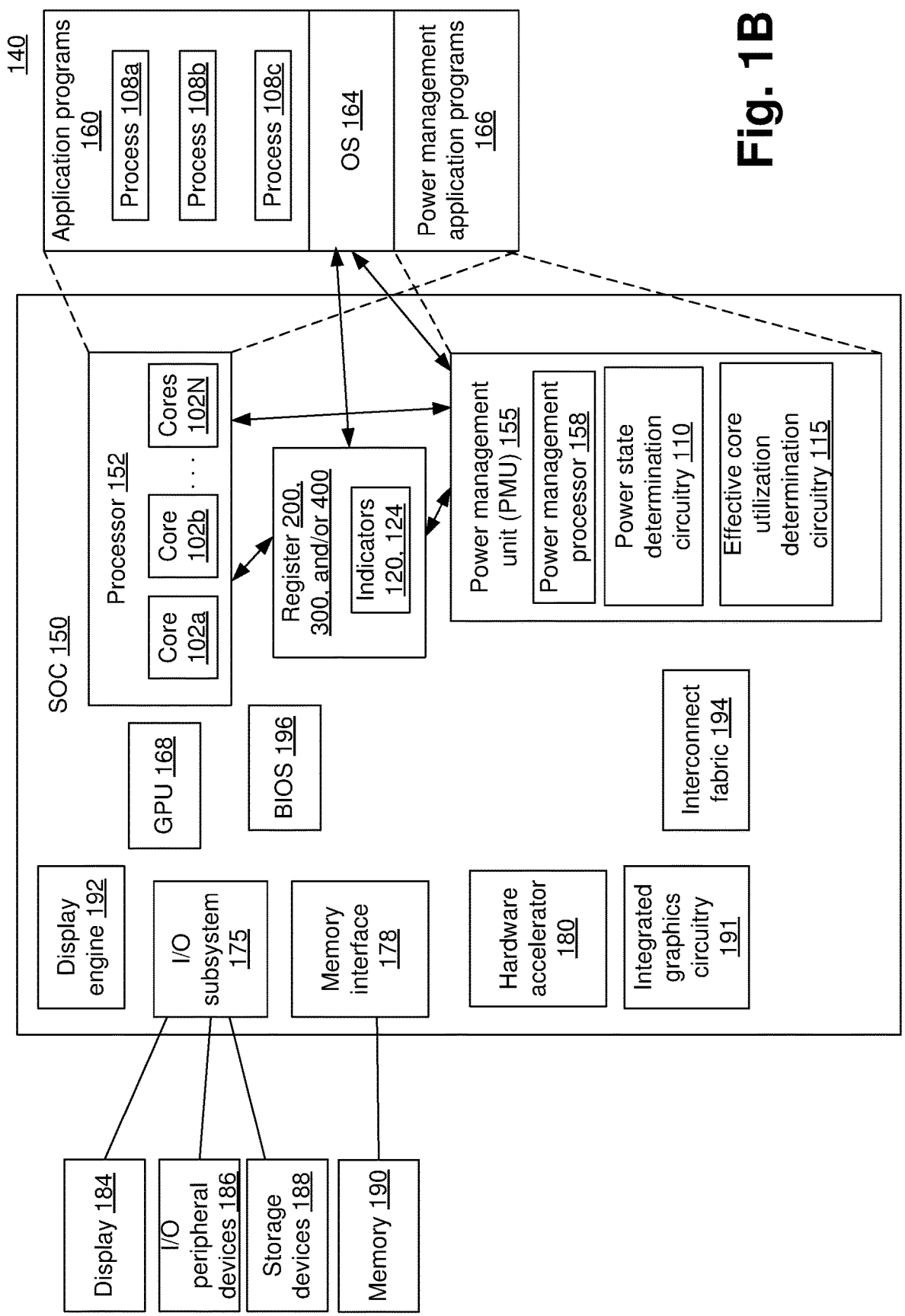
FIG. 1B illustrates an example system including a power management unit (PMU) that implements a power state determination circuitry and an effective core utilization determination circuitry, according to some embodiments.

FIG. 1B illustrates an example system 140 including a power management unit (PMU) 155 that implements the Power state determination circuitry 110 and the effective core utilization determination circuitry 115, according to some embodiments. The system 100 comprises a System on a Chip (SoC) 150. In the example of FIG. 1B, the SoC 150 includes a processor 152 (e.g., a central processing unit (CPU)) comprising the plurality of processing cores 102a, 102b, . . . , 102N of FIG. 1A.

The system 140 comprises the PMU 155. In an example, the PMU 155 may include a dedicated power management processor 158, although in another example a section of the processor 152 (e.g., one or more cores 102) may be used to for the power management processor 158. Although shown to be included within the SOC 150 in FIG. 1B, the PMU 155 may be external to the SOC 150 as well (e.g., as a separate power management integrated circuit chip (PMIC)).

In some embodiments, the power management processor 158 may be used at least in part to implement the power state determination circuitry 110 and the effective core utilization determination circuitry 115. In some other embodiments, the power state determination circuitry 110 and/or the effective core utilization determination circuitry 115 may be separate from the power management processor 158.

Various application programs 160, the OS 164, one or more power management application programs 166, etc. execute on the processor 152 and/or the power management processor 158. For example, the application programs 160 and the OS 164 may execute on the processor 152 (symbolically illustrated using dotted line), and the one or more power management application programs 166 may execute on the power management processor 158 (symbolically illustrated using dotted line). In some embodiments, the application programs 160 includes the processes 108a, 108b, 108c of FIG. 1A.

The system 140 includes a software interface through which the OS 164 communicates with the PMU 155 (e.g., through which the OS 164 communicates with the power state determination circuitry 110 and/or the effective core utilization determination circuitry 115 of the PMU 155). For example, as will be discussed herein later with respect to FIGS. 2, 3, and 4, the OS 164 communicates the indicator 120 and the identifiers 124 to the power state determination circuitry 110 and/or the effective core utilization determination circuitry 115 through such a software interface. In an example, an OS driver (not illustrated in FIG. 1B) of the OS 164 may be a part of the software interface between the OS 164 and the PMU 155. The OS driver may transmit the indicators 120, identifiers 124 from the OS 164 to the PMU 155, e.g., directly or via registers 200, 300, and/or 400 (these registers are discussed in further details with respect to FIGS. 2-4).

Merely as an example, an interface through which the OS 164 communicates with the PMU 155 may include one or more of the registers 200, 300, or 400. For example, the OS 164 may write data in one or more of the registers 200, 300, or 400 (e.g., write the indicators 120 and/or the identifiers 124), and the PMU 155 (e.g., the power state determination circuitry 110 and the effective core utilization determination circuitry 115) may fetch the written data from the registers. In another example, the OS 164 communicates with the PMU 155 directly (e.g., by bypassing the registers), which is illustrated as a direct line between the processor 150 and the PMU 155, and a direct line between the OS 164 and the PMU 155.

In some embodiments, the SOC 150 comprises a graphics processing unit (GPU) 168, an integrated graphics circuitry 191, a hardware accelerator 180 (e.g., which performs functions more efficiently than is possible in software running on the more general-purpose processor 152), a memory interface 178 (e.g., to interface with a memory 190), a display engine 192 (e.g., to render images on a display 184), BIOS 196, etc.

The SOC 150 further comprises an I/O subsystem 175, e.g., for interfacing with one or more input/output devices, such as the display 184, one or more I/O peripheral devices 186, one or more storage devices 188, etc.

Referring again to FIG. 1A, in some embodiments, the device 100 stores the performance or energy efficiency bias indicator 120 (also referred to as indicator 120). The indicator 120 is also referred to herein as "Energy Policy Preference Hint" 120, as "Energy Performance Preference 120," or as "Energy Performance Priority (EPP) 120." FIG. 2 illustrates an example register 200 that stores the performance or energy efficiency bias indicator 120, according to some embodiments. The register 200, merely as an example, may also be referred to as an IA32_Energy_Preference_Bias register 200, or an Energy_Preference_Bias register 200. The indicator 120 may be, merely as an example and as illustrated in FIG. 2, may be a 4-bit field in the register 200. The indicator 120 may provide guidance as to whether favor increasing dynamic performance or conserve energy consumption.

The 4-bit indicator 120 can have a value from any of 0 to 15. The values represent a sliding scale, where a value of 0 (e.g., which may be the default reset value) may correspond to a hint preference for highest performance, and a value of 15 may correspond to a maximum energy savings. A value of, for example, 7 may roughly translate into a hint to balance performance with energy consumption. The bits 0 to 3 of the register 200 may be used for the indicator 120, and the bits 4 to 63 may be reserved for future use. Merely as an example, a value of the indicator 120 being lower than a threshold value may indicate a preference for performance, and a value of the indicator 120 being equal to or higher than the threshold value may indicate a preference for energy savings (e.g., preference for low power).

The Operating System (OS) may dynamically change the indicator 120, based on a variety of factors, such as user input, default configuration, power availability, type of processes being executed, a desired Quality of Service (QoS) of a process, etc. Merely as an example, if battery power of the device 100 is low and/or no Alternating Current (AC) power from an adapter is available, the OS may favor energy savings (e.g., a high value of the indicator 120). In another example, if power availability is sufficient, the OS may prefer performance (e.g., a low value of the indicator 120).

In an example, indicator 120 may be per logical process (e.g., per individual thread 112). Thus, each of the logical processes or threads 112 in the device 100 may be programmed with a different value of the indicator 120. The thread 112a1 may have a first value of the indicator 120, the thread 112a2 may have a second value of the indicator 120, and so on. Put differently, the device 100 may include different instances of the indicator 120, one for a corresponding logical process or thread 112. This may be useful in virtualization scenarios or any other appropriate scenario, where the performance and/or energy requirements of one logical process may differ from the other. The register 200 storing the indicator 120 may be an example of an interface through which the OS indicates whether the OS wants the cores 102 to bias towards performance or energy. For example, the register 200 (e.g., the IA32_Energy_Preference_Bias register 200, or the Energy_Preference_Bias register 200) acts as an interface (e.g., a software interface) for the OS to prescribe a performance vs. energy efficiency preference.

FIG. 3 illustrates another example register 300 that stores the performance or energy efficiency bias indicator 120, according to some embodiments. The register 300, merely as an example, may also be referred to as an IA32_HWP_Request register 300, or as an HWP_Request register 300.

The register 300 includes a minimum performance field 302 comprising bits 7:0. The field 302 may convey a hint to HWP (Hardware Controlled Performance States) hardware. The OS programs the minimum performance hint to achieve a required quality of service (QOS) or to meet a service level agreement (SLA) as needed.

The register 300 includes a maximum performance field 304 comprising bits 15:8, which conveys a hint to the HWP hardware. The OS programs this field to limit the maximum performance that is expected to be supplied by the HWP hardware. Excursions above the limit requested by OS are possible due to hardware coordination between the processor cores and other components in the package.

The register 300 includes a desired performance field 306 comprising bits 23:16, which conveys a hint to the HWP hardware. When set to zero, hardware autonomous selection determines the performance target. When set to a non-zero value, the field 306 conveys an explicit performance request hint to the hardware, effectively disabling HW Autonomous selection. The Desired_Performance input is non-constraining in terms of Performance and Energy Efficiency optimizations, which are independently controlled. A default value of this field is 0.

The register 300 includes the performance or energy efficiency bias indicator 120, where the indicator 120 is also referred to as Energy_Performance_Preference field (or referred to as Energy Performance Priority (EPP) field), comprising bits 31:24. This field conveys a hint to the HWP hardware. The OS may write a range of values from 0 (performance preference) to 0FFH (energy efficiency preference) to influence the rate of performance increase/decrease and the result of the hardware's energy efficiency and performance optimizations. The default value of this field is 80H. In an example, if this field is not supported, the HWP uses the value of the indicator 120 from the register 200 to determine the energy efficiency/performance preference.

The register 300 includes an activity_Window field 310 comprising bits 41:32, which conveys a hint to the HWP hardware specifying a moving workload history observation window for performance/frequency optimizations. If 0, the hardware may determine the appropriate window size. When writing a non-zero value to this field, this field may be encoded in the format of bits 38:32 as a 7-bit mantissa and bits 41:39 as a 3-bit exponent value in powers of 10. The resultant value may be in microseconds. Thus, the minimal/maximum activity window size is 1 microsecond/1270 seconds. In an example, the Activity_Window 310 influences the rate of performance increase and/or decrease. This non-zero hint merely has meaning when the desired performance field 306 is set to 0.

The register 300 includes a package control field 312 comprising bit 42. When set, the field 312 causes a logical processor's IA32_HWP_REQUEST control inputs to be derived from a register IA32_HWP_REQUEST_PKG. The register 300 includes reserved field 314 comprising bits 63:43, which are reserved and set to zero.

Thus, referring to FIGS. 1A-3, the OS may communicate a bias towards performance or energy efficiency through the indicator 120, which may be included in any one or both the registers 200 or 300.

Thus, the register 200 (e.g., which may be the IA32_Energy_Preference_Bias register) and/or the register 300 (e.g., which may be the IA32_HWP_Request register), any of which may store the indicator 120, may be examples of the interface through which the OS indicates whether the OS wants the cores 102 to bias towards performance or energy. For example, the registers 200 and/or 300 acts as an interface (e.g., a software interface) for the OS to prescribe a performance vs. energy efficiency preference.

Referring again to FIG. 1A, in some embodiments, the device 100 stores a logical process identifier 124 (also referred to as identifier 124). Individual logical processes or threads 112 may have a corresponding instance of the identifier 124. As an example, an identifier 124a1 may be associated with a logical process or thread 112a1, an identifier 124a2 may be associated with a logical process or thread 112a2, an identifier 124b1 may be associated with a logical process or thread 112b1, and so on. The identifier 124 for a specific logical process or thread 112 may be a meta data tag indicating the uniqueness of the corresponding logical process or thread. A value of the identifier 124 may uniquely identify the corresponding thread. For example, the OS may tag a thread 112a1 with a corresponding unique attribute using the identifier 124a1, the OS may tag a thread 112b1 with a corresponding unique attribute using the identifier 124b1, and so on (it may be noted that merely a single instance of the identifier, labelled as identifier 124, is illustrated in FIG. 1A).

Figure 4:
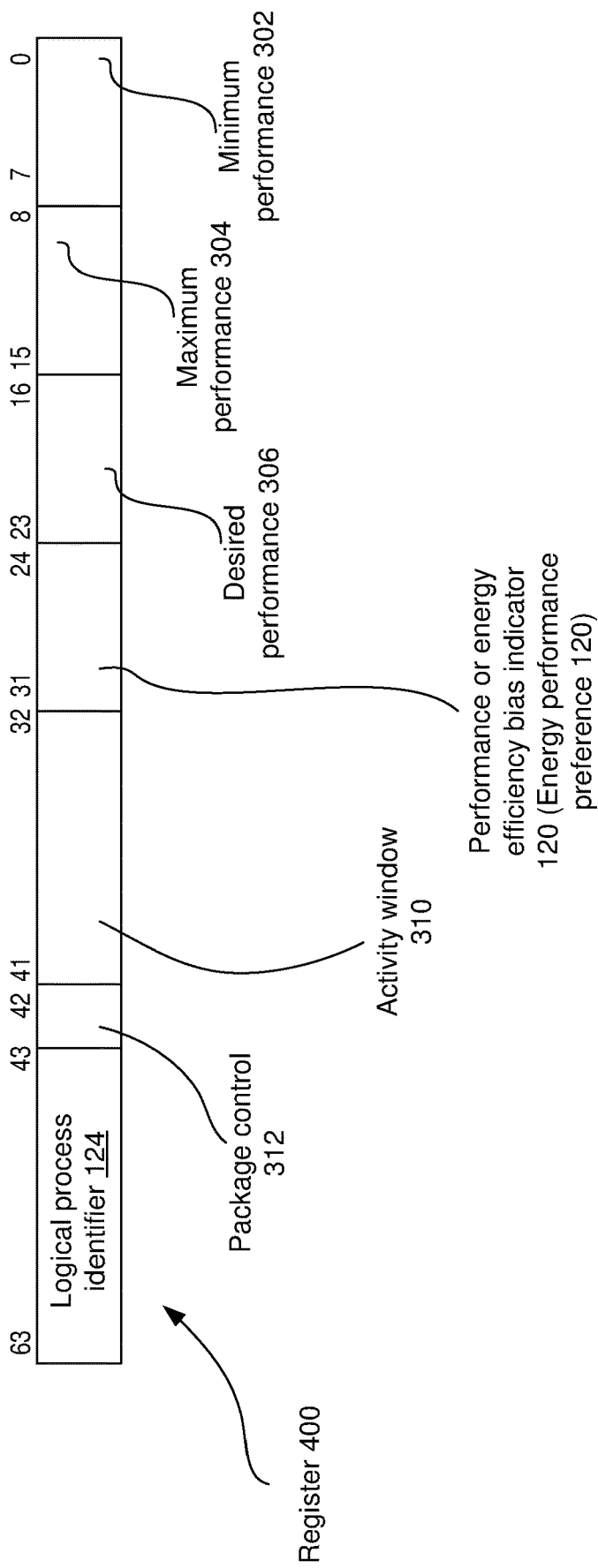
FIG. 4 illustrates an example register including a logical process identifier, according to some embodiments.

FIG. 4 illustrates an example register 400 including the logical process identifier 124, according to some embodiments. The register 400 may be at least in part similar to the register 300 of FIG. 3. The reserved bits 63:43 of the register may be used to store the logical process identifier 124. As discussed with respect to FIG. 3, the register 400 may be the IA32_HWP_Request register (or HWP_Request register), in an example. In another example, the logical process identifier 124 may be included in another appropriate register.

Various fields of the register 400 (e.g., which may be the IA32_HWP_Request register (or HWP_Request register)) are also shown in Table 1 below.

TABLE 1

| Bits | Field |
| --- | --- |
| 0:7 | Minimum_Performance |
| 8:15 | Maximum_Performance |
| 23:16 | Desired_Performance |
| 31:24 | Energy_Performance_Preference |
| 41:32 | Activity Window |
| 42 | Package_Control |
| 63:43 | Logical_Process_Identifier |

Table 1 will be evident based on FIGS. 3-4 and associated discussion. As discussed with respect to FIG. 4 and also shown in Table 1, the register 400 includes the logical process identifier 124 (referred to as "Logical_Process Identifier" in Table 1).

Referring to FIG. 4 and Table 1, in an example, the register 400 provides an interface with the OS that enables the OS to tag co-operative processes 108. For example, the device 100 may support per logical process instances of the register 400. Thus, the OS may request a level of performance and energy and/or performance priority (e.g., using the indicator 120) on a per logical process basis. An extension to this interface (e.g., the register 400) is to have the OS add the meta data tag (e.g., the identifier 124) indicating the uniqueness of this logical process. Thus, the register 400 can be used as a software interface by the OS to identify co-operative processes 108 using a unique attribute, e.g., using the identifier 124 (e.g., the Logical Process Identifier field 124) of the register 300.

The unique attribute or identifier 124 may be used to denote all the logical processes belong to the same parent process. For example, the referring to FIG. 1A, individual ones of the threads 112a1, 112a2, . . . , 112aP may be assigned corresponding instances of the identifier 124 (e.g., the threads 112a1, 112a2, . . . , 112aP may be respectively assigned identifiers 124a1, 124a2, . . . , 124aP). The identifiers 124a1, 124a2, . . . , 124aP may be used to identify the parent process 108 to which the threads 112a1, 112a2, . . . , 112aP belong. Put differently, the identifiers 124a1 and 124a2 may not only uniquely identify the threads 112a1 and 112a2, respectively, but also identify that these threads belong to the same parent process 108a.

In an example, the identifier 124 also identifies a logical processor 105 in which the corresponding thread 112 is being executed. For example, if the thread 112a1 is being executed in the logical processor 105a2, the identifier 124a1 may identify the logical processor 105a2.

FIG. 5 illustrates a graph 500 illustrates example processing cores 102a, 102b, 102c executing various threads, according to some embodiments. The X axis represents time, and the Y axis represents the cores 102a, 102b, 102c. For example, between time t0 and t2, the thread 112a1 (e.g., which is identified using the indicator 124a1) of the process 108a is being executed at core 102a. At time t2, the process 108a migrates to core 102b, and the thread 112a3 of the process 108a is being executed at core 102b from time t2 to time t4. Between time t1 and t3, the thread 112b2 (e.g., which is identified using the indicator 124b2) of the process 108b is being executed at core 102b. The identifiers 124a1 and 124a3 respectively indicates that the process 108a is being executed in the core 102a from time t0 to t2, and is being executed in the core 102b from time t2 to t4, and It is assumed that the time interval between time t0 and t1 is same as time interval between time t1 and t2, same as the time interval between time t2 and t3, and so on. The graph 500 is merely an example, is a simplistic representation of thread execution at various cores, and does not limit the scope of this disclosure.

A utilization is referred to as a ratio of: a duration of a C0 state (e.g., an operating or active state) during a time period, and the time period. Thus, a utilization tracks a C0 residence over a specific duration of time. The utilization is also referred to herein as C0_residency.

For example, referred to FIG. 5, a utilization of the core 102a from time t0 to t5 is ⅖, or 40% (e.g., for 40% of the time between t0 and t5, the core 102a is executing threads). The utilization of each of the cores 102b, 102c is also 40%. The utilization of a core is also referred to herein as core utilization, core_C0_utilization, core_C0_residency, or the like. Thus, the core utilization for each of the cores 102a, 102b, 102c from time t0 to t5 is 40%.

The utilization of the process 108a (e.g., note that the threads 112a1 and 112a3 are spawned by the same parent process 108a) is ⅘, or 80% (e.g., for 80% of the time between t0 and t5, one or more threads of the process 108a are being executed). The utilization of the process 108b (e.g., note that the threads 112b2 is spawned by the process 108b) is ⅖, or 40%. The utilization of a process is also referred to herein as process utilization, process_C0_utilization, process_C0_residency, or the like. Thus, the process utilization for the processes 108a and 108b from time t0 to t5 are 80% and 40%, respectively. For example, if a process spawns multiple logical processes or threads (e.g., if the identifiers 124 of multiple threads indicate that the threads belong to the same parent process), the process utilization would be a union or sum of C0 residence of these threads.

The utilization of the combination of all the cores of the device 100 from time t0 to t5 is ⅘, or 80%. The utilization of the combination of all the cores is also referred to herein as device utilization, package utilization, package_C0_utilization, package_C0_residency, or the like, which is 80% in the example graph 500.

The utilization of the thread 112a1 from time t0 to t5 is ⅖, or 40%. The utilization of each of the threads 112a3 and 112b2 from time t0 to t5 is also ⅖, or 40%. The utilization of a thread is also referred to herein as thread utilization, thread_C0_utilization, thread_C0_residency, or the like.

FIG. 6 illustrates an example pseudo-code 600 for determining a process_C0_residency, a thread_C0_residency, and a package_C0_residency, according to some embodiments. For example, as discussed with respect to FIG. 5, these C0 residencies may be determined based on tracking execution of individual threads using the identifiers 124. The IA32_HWP_Request referred to in the pseudo-code 600 refers to the register 400, which outputs the identifier 124 for a given thread. The principle of operation of the pseudo-code 600 has been discussed with respect to FIG. 5.

Thus, FIG. 6 outputs the process_C0_residency for each of one or more of the processes 108a, 108b, . . . , 108c. FIG. 6 outputs the thread_C0_residency for each of one or more of the threads 112a1, . . . , 112aP, 112b1, . . . , 112bQ, 112c1, . . . , 112cR. FIG. 6 outputs the package_C0_residency (also referred to as pkg_C0_residency in FIG. 6) for the combination of all the cores 102a, . . . , 102N.

Although not illustrated in FIG. 6, a core_C0_residency may also be determined for each of one or more of the cores 102a, . . . , 102N. For example, a core_C0_residency of a core 102 may be a union of the thread_C0_residency of all the threads being executed in the core 102.

FIG. 7A illustrates an example pseudo-code 700 for determining an "effective core utilization" of a core, based on the "Performance or energy efficiency bias indicator 120" of FIG. 1A, according to some embodiments. For example, as discussed with respect to FIGS. 1A-3, the indicator 120 (e.g., which may be the Energy Policy Preference Hint) provides an indication on whether the OS favors performance or energy efficiency.

If the indicator 120 has a relatively low value (e.g., lower than a threshold), this implies that the OS favors performance over energy efficiency. As illustrated in FIG. 7A, if the OS favors performance over energy efficiency (e.g., as indicated by the indicator 120), the effective utilization of the core may be based on (e.g., may be equal to) utilization of a process being executed in the core. On the other hand, if the OS favors energy efficiency over performance (e.g., the "Else" clause in FIG. 7A), the effective utilization of the core may be based on (e.g., may be equal to) an actual utilization of the core. This process may be repeated for all cores 102a, . . . , 102N of the device 100.

Thus, put differently, if the OS wants to bias towards performance, the effective utilization of a core over a time window is determined based on cumulative utilization of the process running on various cores. For example, referring to FIG. 5, for core 102a, if the OS wants to bias towards performance, the effective utilization of the core 102a is a union or cumulation of the utilization of the process 108a running on various cores (e.g., cores 102a, 102b). Thus, the effective utilization of the core 102a for this example is 80%. For example, if a process (or underlying threads) is migrating between two cores, the effective utilization for the process may be calculated based on the total utilization of the process over the two cores.

On the other hand, if the OS wants to bias towards energy efficiency, the effective utilization of the core over the time window for that core is determined based on the C0 residency of that specific core. For example, referring to FIG. 5, for core 102a, if the OS wants to bias towards energy efficiency, the effective utilization of the core 102a is the utilization of the core 102a, which is 40%.

Referring to FIGS. 1A and 7A, the device 100 includes an "effective core utilization determination circuitry 115" (also referred to as circuitry 115). In an example, the circuitry 115 determines the effective utilization of various cores, e.g., as discussed with respect to FIG. 7A.

FIG. 7B illustrates an example pseudo-code 750 for determining an effective core utilization of a core, based on the "Performance or energy efficiency bias indicator 120" of FIG. 1A, according to some embodiments. The pseudo-codes 700 and 750 are at least in part similar. However, in the code 750, if the OS favors performance over energy efficiency (e.g., as indicated by the indicator 120), the effective utilization of the core may be based on (e.g., may be equal to) the package utilization (e.g., instead of being based on a utilization of a process being executed in the core).

In an example, the pseudo-code 750 may be used (e.g., instead of the pseudo-code 700) in situations where, for example, is may not be possible or desirable to determine the process utilization. Such a scenario may arise when the logical process identifier 124 may not be available.

For example, the logical process identifier 124 is used to determine the process utilization (e.g., the logical process identifier 124 is used to identify a parent process of a thread, and hence, is used to track the process utilization). When the logical process identifier 124 is not available, the process utilization may not be effectively tracked, and the pseudo-code 750 may be used (e.g., instead of the pseudo-code 700).

In some embodiments, the device 100 includes the power state determination circuitry 110, e.g., for determining a power state (e.g., where a power state refers to a corresponding operating voltage and/or a corresponding operating frequency, such as a specific P-state in accordance with ACPI standards) for individual cores (illustrated in FIG. 1A). For example, once an effective utilization of a core 102 is determined (e.g., as discussed with respect to FIGS. 7A-7B), an appropriate power state of a core may be selected based on the effective utilization of the core. The power state, such as the P-state of the core in an example, is an ACPI state, which may specify a frequency, voltage, and/or other operating parameters for the core. For example, a power state, such as a P-state, may be selected from a P1 state, a P2 state, a P3 state, etc. Each of the P1, P2, P3 states may be associated with corresponding frequency, voltage, and/or other operating parameters for the core. Thus, selecting a power state, such as a P-state, may be akin to selecting an operating frequency, voltage, and/or other operating parameters for the core. As discussed herein above, the selection of the power state (or the selection of operating voltage, frequency, etc.) for a core 102 (e.g., core 102a) may be based on the effective utilization of the core 102 (e.g., core 102a).

For example, if the core 102a has a relatively higher effective utilization, the core 102a may be operated at relatively high voltage and/or frequency. On the other hand, if the core 102a has a relatively lower effective utilization, the core 102a may be operated at relatively low voltage and/or frequency. Any appropriate type of controller (e.g., a proportional controller, a PID controller, etc.) may be used to determine a power state (e.g., a P-state) for a core, based on the effective utilization of the core.

FIG. 8 illustrates a flowchart depicting a method 840 for assigning operating voltage and/or operating frequency to individual cores 102 of the system 100 of FIG. 1A, according to some embodiments. Although the blocks in the flowchart with reference to FIG. 8 are shown in a particular order, the order of the actions can be modified. Thus, the illustrated embodiments can be performed in a different order, and some actions/blocks may be performed in parallel. Some of the blocks and/or operations listed in FIG. 8 may be optional in accordance with certain embodiments. The numbering of the blocks presented is for the sake of clarity and is not intended to prescribe an order of operations in which the various blocks must occur.

At 804 of the method 800, an indicator (e.g., indicator 120), which indicates a preference for either performance or energy efficiency, may be received from the OS (e.g., OS 164 of FIG. 1B). For example, the effective core utilization determination circuitry 115 may receive the indicator 120 via any of the registers 200, 300, and/or 400.

At 808, one or more identifiers (e.g., identifiers 124), each of which uniquely identify a corresponding process, may be received from the OS (e.g., OS 164 of FIG. 1B). For example, the effective core utilization determination circuitry 115 may receive the identifiers via any of the register 400.

At 812, a utilization of a first process may be determined (e.g., by the effective core utilization determination circuitry 115), based at least in part on the identifiers 124, e.g., as discussed with respect to FIGS. 5, 6, and 7A. In an example, a first processing core (e.g., core 102a) is to at least in part execute the first process. Also at 812, a utilization of the first processing core may be determined (e.g., by the effective core utilization determination circuitry 115), e.g., as discussed with respect to FIGS. 5, 6, and 7A.

At 816, one of the utilization of the first process or the utilization of the first processing core may be selected (e.g., by the effective core utilization determination circuitry 115) as an effective utilization of the first processing core, based on the indicator 120, e.g., as discussed with respect to FIG. 7A.

At 820, at least one of an operating voltage or an operating frequency of the first processing core may be selected (e.g., by the power state determination circuitry 110), based at least in part on the effective utilization of the first processing core, e.g., as discussed herein above in further details.

Figure 9:
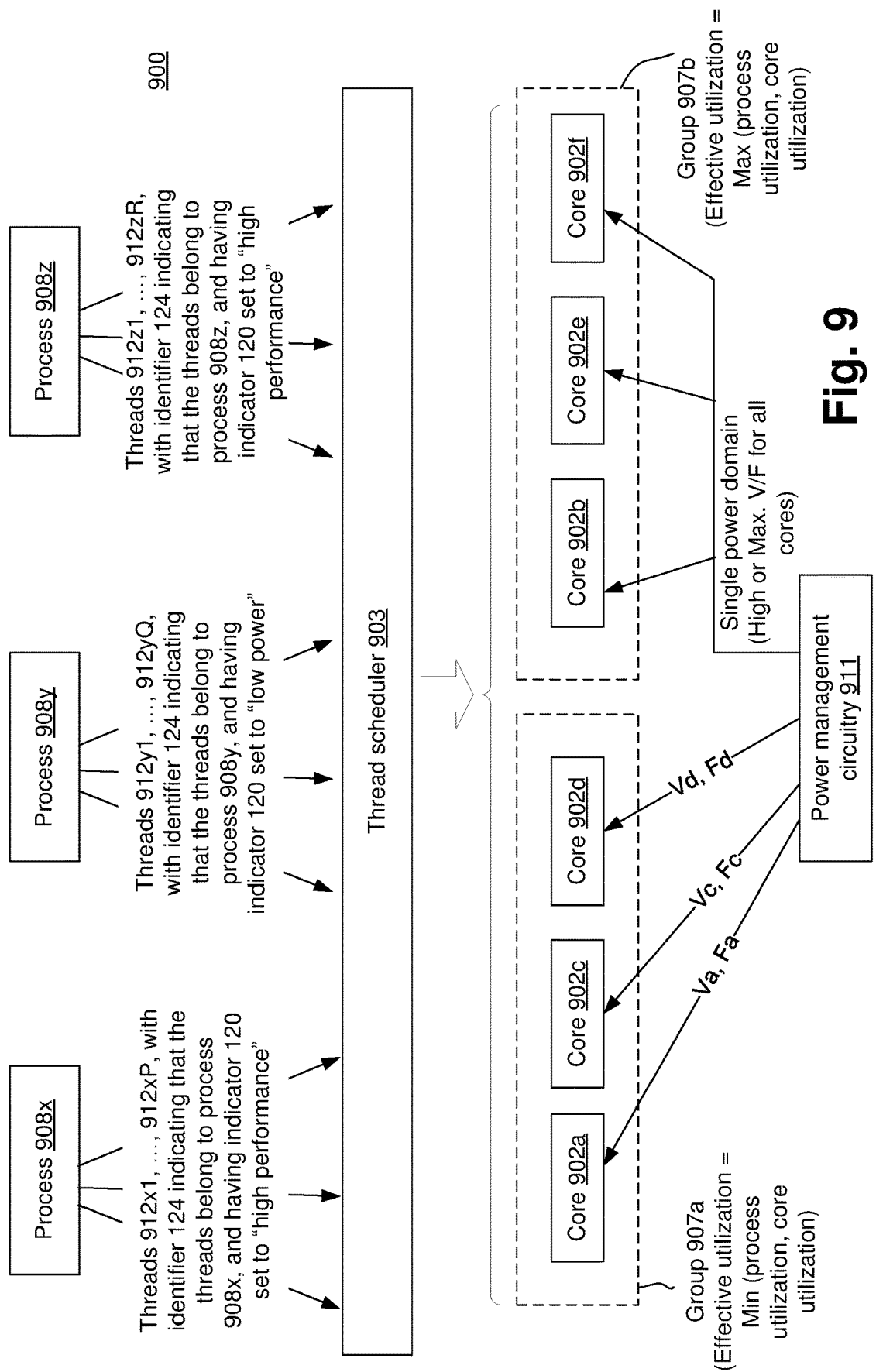
FIG. 9 schematically illustrates a computing device that determines operating states of processing cores, based on an effective utilization of the processing cores, according to some embodiments.

FIG. 9 schematically illustrates a computing device 900 (also referred to as device 900) that determines operating states (e.g., power states, voltages, frequencies, etc.) of processing cores, based on an effective utilization of the processing cores, according to some embodiments. The device 900 comprises cores 902a, ..., 902f (e.g., which may be similar to the cores 102 of FIG. 1A). Processes 908x, 908y, 908z (e.g., which may be similar to the processes 108 of FIG. 1A) are executed by the device 900.

The process 908x generates threads 912x1, ..., 912xP, each of which have corresponding identifiers 124 (e.g., identifiers 124x1, ..., 124xP, respectively). The identifiers 124x of the threads 912x identify the process 908x as the parent process. It is assumed, merely as an example, that the indicators 120 associated with the threads 912x1, ..., 912xP indicate a preference for high performance.

The process 908y generates threads 912y1, ..., 912yQ, each of which have corresponding identifiers 124 (e.g., identifiers 124y1, ..., 124yQ, respectively). The identifiers 124y of the threads 912y identify the process 908y as the parent process. It is assumed that the indicators 120 associated with the threads 912y1, 912yQ indicate a preference for low power (e.g., energy conservation).

The process 908z generates threads 912z1, ..., 912zR, each of which have corresponding identifiers 124 (e.g., identifiers 124z1, ..., 124zR, respectively). The identifiers 124z of the threads 912z identify the process 908z as the parent process. It is assumed that the indicators 120 associated with the threads 912z1, ..., 912zR indicate a preference for high performance.

Thus, the processes 908x and 908z have a preference for high performance, while the process 908 has a preference for low power or energy conservation. In some embodiments, a thread scheduler 903 schedules the threads 912 for execution in various cores 902a, ..., 902f.

In some embodiments, the power state of the cores 902 may be determined based on effective utilization of the cores 902. In the example of FIG. 9, the effective utilization of first one or more cores is maximum of process utilization or core utilization (e.g., Effective utilization=Max (process utilization, core utilization)). The effective utilization of second one or more cores is minimum of process utilization or core utilization (e.g., Effective utilization=Min (process utilization, core utilization)).

For example, as illustrated in FIG. 9, the effective utilization of the core 902a is minimum of (process utilization, core utilization), where the process utilization and the core utilization are discussed with respect to FIG. 7A-7B. Also, the effective utilization of the core 902b is maximum of (process utilization, core utilization).

Thus, in FIG. 9, the threads 912 are dynamically divided into two main groups: high performance threads (e.g., threads 912x, 912z), and low power threads (e.g., threads 912y). The cores 902 are also dynamically grouped into two groups: group 907a, 907b.

The group 907b includes cores 902b, 902e, 902f, which handles high performance threads. Cores 902b, 902e, 902f of the group 907b, accordingly, have effective utilization=Max (process utilization, core utilization). The cores 902b, 902e, 902f of the group 907b may be set on a single power domain (SPD), and are to handle the high-performance threads (e.g., threads 912x, 912z). Accordingly, in some embodiments, the cores of the group 907b may be set for the single power domain having a high value of frequency and/or a high value of voltage (e.g., maximum frequency and/or maximum voltage).

The group 907a includes cores 902a, 902c, 902d, which handle low power threads (e.g., thread having preference for low power, such as threads 912y). Cores 902a, 902c, 902d of the group 907a, accordingly, have effective utilization=Min (process utilization, core utilization). In some embodiments, a voltage and/or a frequency of the cores of this group 907a are determined dynamically by a power management circuitry 911 (also referred to as circuitry 911). For example, the circuitry 911 sets voltage Va, frequency Fa for the core 902a; sets voltage Vc, frequency Fc for the core 902c; and so on. The cores of the group 907a are on a per core p-state (PCPS) set, as the power state of the cores of this group is determined on an individual core basis.

The thread scheduler 903 (e.g., which may be operated by the OS) may allow high performance threads to migrate and execute primarily (e.g., only) among the cores of the group 907b, and may allow low power threads to migrate and execute primarily (e.g., only) among the cores of the group 907a. The core groups may be pre-allocated in advance and communicated to the OS, and/or allocated dynamically based on the OS needs. Thus, the high-performance threads 912x, 912z may be executed by the cores of the group 907b; and the low power threads 912y may be executed by the cores of the group 907a, Running some of the cores (e.g., cores of the group 907b) on a single power domain (e.g., selecting relatively high, such as maximum, voltage and/or frequency for these cores) provides high performance, and prevents from using unnecessary power for the other cores (e.g., cores of the group 907a) that may not require much performance. Per core power state (e.g., for the group 907a) may optimize the power consumption by running each core on a corresponding voltage and/or frequency based on its power and/or performance requirements.

In a conventional system, performance may be impacted due to thread migration between different cores. For example, performance hit may occur when a thread migrates from one core running at high power state to another operating at a low power state. However, in the example of FIG. 9, the thread scheduler 903 allows high performance threads to migrate and execute primarily (e.g., only) among the cores of the group 907b, and allows low power threads to migrate and execute primarily (e.g., only) among the cores of the group 907a. This prevents from the above discussed performance impact due to thread migration, thereby improving the performance of the device 900.

In some embodiments, the circuitry 911 monitors the indicator 120 of the threads being scheduled on a core. If the indicator 120 is lower than a threshold value (e.g., which indicates bias towards performance), the circuitry 911 runs the core on the single power domain (e.g., groups the core in group 907b). On the other hand, if the indicator 120 of the threads scheduled for a core is higher than the threshold value (e.g., which indicates bias towards low power), the circuitry 911 runs the core on a per core power state (e.g., groups the core in group 907a). This prevents any performance issues due to threads migration, as well as provide low power optimization for the low power threads.

Figure 10:
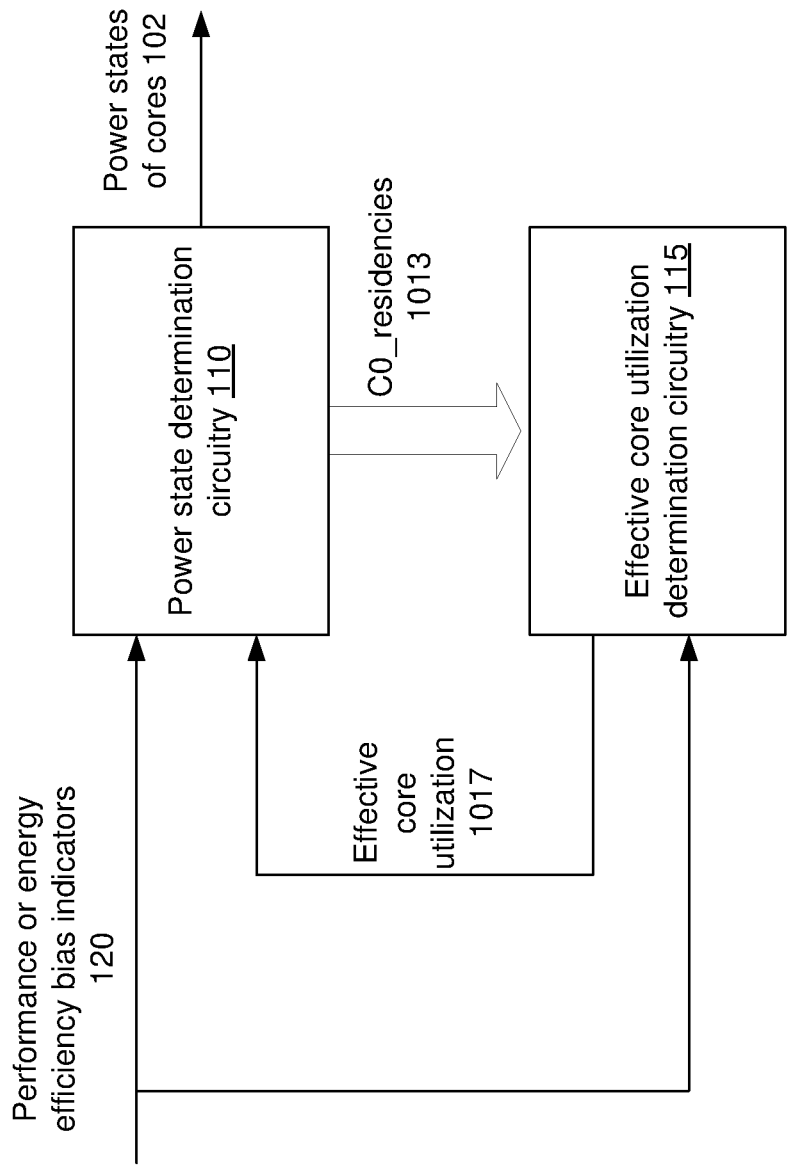
FIG. 10 illustrates a power state determination circuitry and an effective core utilization determination circuitry, according to some embodiments.

FIG. 10 illustrates a power state determination circuitry 110 and an effective core utilization determination circuitry 115, according to some embodiments. For example, as discussed with respect to FIG. 1A, the device 100 of FIG. 1A (and also the device 900 of FIG. 9) may include the circuitries 110, 115. The power state determination circuitry 110 receives the performance or energy efficiency bias indicators 120 for various threads, and also receives effective core utilization 1017 (e.g., from the effective core utilization determination circuitry 115). The effective core utilization determination circuitry 115 determines the effective core utilization 1017 using the pseudo-codes 700 and/or 750 of FIG. 7A and/or 7B.

The power state determination circuitry 110 determines the power states of the various cores 102, e.g., based on the indicators 120 and the effective core utilization 1017. Determination of the power state involves determining an operating voltage and/or operating frequency of individual cores that are active (e.g., that are in C0 operating state). Any appropriate type of controller (e.g., a proportional controller, a PID controller, etc.) may be used in the power state determination circuitry 110.

The power state determination circuitry 110 may also determine various C0 residencies 1013, such as core_C0_residency, package_C0_residency, thread_C0_residency, process_C0_residency, e.g., as discussed with respect to FIG. 6. The effective core utilization determination circuitry 115 receives the various C0 residency 1013, and determines the effective core utilization 1017 using, for example, the pseudo-codes 700 and/or 750 of FIG. 7A and/or 7B. In an example, the effective core utilization determination circuitry 115 receives the indicators 120, and determines the effective core utilization 1017 based on the indicators 120.

It is to be noted that any reference to circuitry (e.g., circuitry 110, 115) are not for restricting merely to circuitries. For example, individual ones of the circuitries 110, 115 may be use any circuit elements, hardware, software, firmware, logic, etc., for operation.

Figure 11:
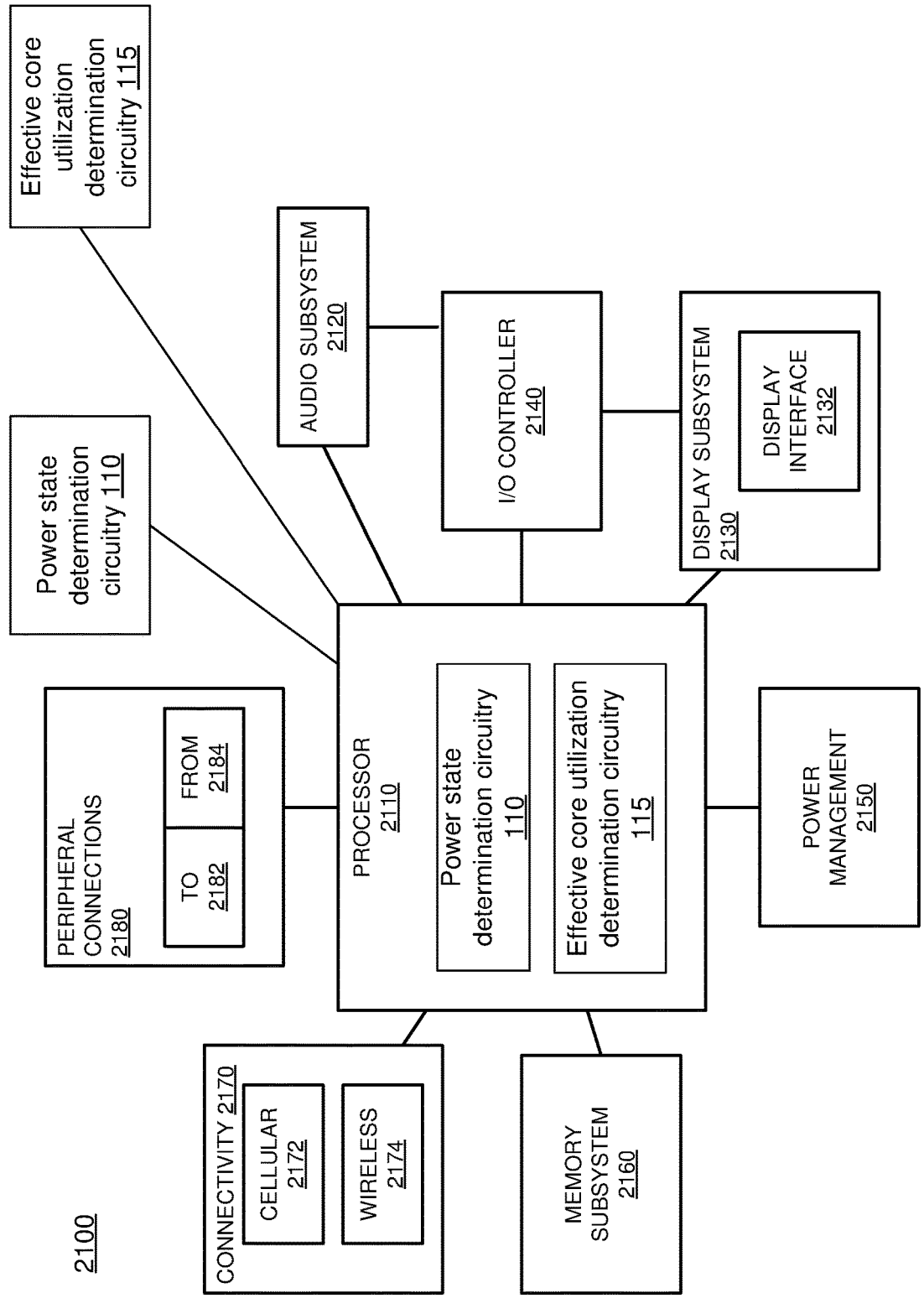
FIG. 11 illustrates a computer system, a computing device or a SoC (System-on-Chip), where operating states of processing cores are determined based on a "performance or energy efficiency bias indicator" and an "effective core utilization," according to some embodiments.

FIG. 11 illustrates a computer system, a computing device or a SoC (System-on-Chip) 2100, where operating states (e.g., power states, frequencies, voltages, etc.) of processing cores are determined based on a "performance or energy efficiency bias indicator" and an "effective core utilization," according to some embodiments. It is pointed out that those elements of FIG. 11 having the same reference numbers (or names) as the elements of any other figure can operate or function in any manner similar to that described, but are not limited to such.

In some embodiments, computing device 2100 represents an appropriate computing device, such as a computing tablet, a mobile phone or smart-phone, a laptop, a desktop, an IOT device, a server, a set-top box, a wireless-enabled e-reader, or the like. It will be understood that certain components are shown generally, and not all components of such a device are shown in computing device 2100.

In some embodiments, computing device 2100 includes a first processor 2110. The various embodiments of the present disclosure may also comprise a network interface within 2170 such as a wireless interface so that a system embodiment may be incorporated into a wireless device, for example, cell phone or personal digital assistant.

In one embodiment, processor 2110 can include one or more physical devices, such as microprocessors, application processors, microcontrollers, programmable logic devices, or other processing means. The processing operations performed by processor 2110 include the execution of an operating platform or operating system on which applications and/or device functions are executed. The processing operations include operations related to I/O with a human user or with other devices, operations related to power management, and/or operations related to connecting the computing device 2100 to another device. The processing operations may also include operations related to audio I/O and/or display I/O.

In one embodiment, computing device 2100 includes audio subsystem 2120, which represents hardware (e.g., audio hardware and audio circuits) and software (e.g., drivers, codecs) components associated with providing audio functions to the computing device. Audio functions can include speaker and/or headphone output, as well as microphone input. Devices for such functions can be integrated into computing device 2100, or connected to the computing device 2100. In one embodiment, a user interacts with the computing device 2100 by providing audio commands that are received and processed by processor 2110.

Display subsystem 2130 represents hardware (e.g., display devices) and software (e.g., drivers) components that provide a visual and/or tactile display for a user to interact with the computing device 2100. Display subsystem 2130 includes display interface 2132, which includes the particular screen or hardware device used to provide a display to a user. In one embodiment, display interface 2132 includes logic separate from processor 2110 to perform at least some processing related to the display. In one embodiment, display subsystem 2130 includes a touch screen (or touch pad) device that provides both output and input to a user.

I/O controller 2140 represents hardware devices and software components related to interaction with a user. I/O controller 2140 is operable to manage hardware that is part of audio subsystem 2120 and/or display subsystem 2130. Additionally, I/O controller 2140 illustrates a connection point for additional devices that connect to computing device 2100 through which a user might interact with the system. For example, devices that can be attached to the computing device 2100 might include microphone devices, speaker or stereo systems, video systems or other display devices, keyboard or keypad devices, or other I/O devices for use with specific applications such as card readers or other devices.

As mentioned above, I/O controller 2140 can interact with audio subsystem 2120 and/or display subsystem 2130. For example, input through a microphone or other audio device can provide input or commands for one or more applications or functions of the computing device 2100. Additionally, audio output can be provided instead of, or in addition to display output. In another example, if display subsystem 2130 includes a touch screen, the display device also acts as an input device, which can be at least partially managed by I/O controller 2140. There can also be additional buttons or switches on the computing device 2100 to provide I/O functions managed by I/O controller 2140.

In one embodiment, I/O controller 2140 manages devices such as accelerometers, cameras, light sensors or other environmental sensors, or other hardware that can be included in the computing device 2100. The input can be part of direct user interaction, as well as providing environmental input to the system to influence its operations (such as filtering for noise, adjusting displays for brightness detection, applying a flash for a camera, or other features).

In one embodiment, computing device 2100 includes power management 2150 that manages battery power usage, charging of the battery, and features related to power saving operation. Memory subsystem 2160 includes memory devices for storing information in computing device 2100. Memory can include nonvolatile (state does not change if power to the memory device is interrupted) and/or volatile (state is indeterminate if power to the memory device is interrupted) memory devices. Memory subsystem 2160 can store application data, user data, music, photos, documents, or other data, as well as system data (whether long-term or temporary) related to the execution of the applications and functions of the computing device 2100. In one embodiment, computing device 2100 includes a clock generation subsystem 2152 to generate a clock signal.

Elements of embodiments are also provided as a machine-readable medium (e.g., memory 2160) for storing the computer-executable instructions (e.g., instructions to implement any other processes discussed herein). The machine-readable medium (e.g., memory 2160) may include, but is not limited to, flash memory, optical disks, CD-ROMs, DVD ROMs, RAMs, EPROMs, EEPROMs, magnetic or optical cards, phase change memory (PCM), or other types of machine-readable media suitable for storing electronic or computer-executable instructions. For example, embodiments of the disclosure may be downloaded as a computer program (e.g., BIOS) which may be transferred from a remote computer (e.g., a server) to a requesting computer (e.g., a client) by way of data signals via a communication link (e.g., a modem or network connection).

Connectivity 2170 includes hardware devices (e.g., wireless and/or wired connectors and communication hardware) and software components (e.g., drivers, protocol stacks) to enable the computing device 2100 to communicate with external devices. The computing device 2100 could be separate devices, such as other computing devices, wireless access points or base stations, as well as peripherals such as headsets, printers, or other devices.

Connectivity 2170 can include multiple different types of connectivity. To generalize, the computing device 2100 is illustrated with cellular connectivity 2172 and wireless connectivity 2174. Cellular connectivity 2172 refers generally to cellular network connectivity provided by wireless carriers, such as provided via GSM (global system for mobile communications) or variations or derivatives, CDMA (code division multiple access) or variations or derivatives, TDM (time division multiplexing) or variations or derivatives, or other cellular service standards. Wireless connectivity (or wireless interface) 2174 refers to wireless connectivity that is not cellular, and can include personal area networks (such as Bluetooth, Near Field, etc.), local area networks (such as Wi-Fi), and/or wide area networks (such as WiMax), or other wireless communication.

Peripheral connections 2180 include hardware interfaces and connectors, as well as software components (e.g., drivers, protocol stacks) to make peripheral connections. It will be understood that the computing device 2100 could both be a peripheral device ("to" 2182) to other computing devices, as well as have peripheral devices ("from" 2184) connected to it. The computing device 2100 commonly has a "docking" connector to connect to other computing devices for purposes such as managing (e.g., downloading and/or uploading, changing, synchronizing) content on computing device 2100. Additionally, a docking connector can allow computing device 2100 to connect to certain peripherals that allow the computing device 2100 to control content output, for example, to audiovisual or other systems.

In addition to a proprietary docking connector or other proprietary connection hardware, the computing device 2100 can make peripheral connections 2180 via common or standards-based connectors. Common types can include a Universal Serial Bus (USB) connector (which can include any of a number of different hardware interfaces), DisplayPort including MiniDisplayPort (MDP), High Definition Multimedia Interface (HDMI), Firewire, or other types.

In some embodiments, the computing device 2100 may comprise the power state determination circuitry 110, effective core utilization determination circuitry 115, etc., as discussed with respect to FIGS. 1A-10. FIG. 11 illustrates various example locations of the power state determination circuitry 110 and the effective core utilization determination circuitry 115. The power state determination circuitry 110 and/or the effective core utilization determination circuitry 115 may be included in the processor 2110, in an example. The power state determination circuitry 110 and/or the effective core utilization determination circuitry 115 may be coupled to the processor 2110, in another example. The power state determination circuitry 110 and/or the effective core utilization determination circuitry 115 may be included in a PMU, or a PMIC, e.g., as discussed with respect to FIG. 1B, in another example. For example, operating states (e.g., power states, frequencies, voltages, etc.) of various processing cores (e.g., which are included in the processors 2110) are determined based on a "performance or energy efficiency bias indicator" and an "effective core utilization," as discussed with respect to FIGS. 1A-10.

Reference in the specification to "an embodiment," "one embodiment," "some embodiments," or "other embodiments" means that a particular feature, structure, or characteristic described in connection with the embodiments is included in at least some embodiments, but not necessarily all embodiments. The various appearances of "an embodiment," "one embodiment," or "some embodiments" are not necessarily all referring to the same embodiments. If the specification states a component, feature, structure, or characteristic "may," "might," or "could" be included, that particular component, feature, structure, or characteristic is not required to be included. If the specification or claim refers to "a" or "an" element, that does not mean there is only one of the elements. If the specification or claims refer to "an additional" element, that does not preclude there being more than one of the additional element.

Furthermore, the particular features, structures, functions, or characteristics may be combined in any suitable manner in one or more embodiments. For example, a first embodiment may be combined with a second embodiment anywhere the particular features, structures, functions, or characteristics associated with the two embodiments are not mutually exclusive While the disclosure has been described in conjunction with specific embodiments thereof, many alternatives, modifications and variations of such embodiments will be apparent to those of ordinary skill in the art in light of the foregoing description. The embodiments of the disclosure are intended to embrace all such alternatives, modifications, and variations as to fall within the broad scope of the appended claims.

In addition, well known power/ground connections to integrated circuit (IC) chips and other components may or may not be shown within the presented figures, for simplicity of illustration and discussion, and so as not to obscure the disclosure. Further, arrangements may be shown in block diagram form in order to avoid obscuring the disclosure, and also in view of the fact that specifics with respect to implementation of such block diagram arrangements are highly dependent upon the platform within which the present disclosure is to be implemented (i.e., such specifics should be well within purview of one skilled in the art). Where specific details (e.g., circuits) are set forth in order to describe example embodiments of the disclosure, it should be apparent to one skilled in the art that the disclosure can be practiced without, or with variation of, these specific details. The description is thus to be regarded as illustrative instead of limiting.

The following examples pertain to further embodiments. Specifics in the example may be used anywhere in one or more embodiments. All optional features of the apparatus described herein may also be implemented with respect to a method or process.

Example 1. An apparatus comprising: a plurality of processor cores to execute a plurality of processes; a register to store an indicator that is to indicate a preference for either performance or energy efficiency; a first circuitry to determine an effective utilization of a first processor core, based at least in part on the indicator; and a second circuitry to select at least one of an operating voltage or an operating frequency for the first processor core, based at least in part on the effective utilization of the first processing core.

Example 2. The apparatus of example 1 or any other example, wherein: individual processes of the plurality of processes is to spawn corresponding one or more threads, such that the plurality of processes is to spawn a plurality of threads; and the first circuitry is to: determine a utilization of a first process of the plurality of processes, wherein the first processing core is to at least in part execute the first process, determine a utilization of the first processing core, and select, as the effective utilization of the first processing core, one of: the utilization of the first process, or the utilization of the first processing core.

Example 3. The apparatus of example 2 or any other example, wherein: the first circuitry is to one of: select, as the effective utilization of the first processing core, the utilization of the first process, in response to the indicator having an indication for a preference for performance, or select, as the effective utilization of the first processing core, the utilization of the first processing core, in response to the indicator having an indication for a preference for energy efficiency.

Example 4. The apparatus of example 2 or any other example, wherein to determine the utilization of the first processing core, the first circuitry is to: track utilization of a one or more threads being executed by the first processing core; and determine the utilization of the first processing core to be a union of the utilization of the one or more threads being executed by the first processing core.

Example 5. The apparatus of example 2 or any other example, wherein to determine the utilization of the first process, the first circuitry is to: track utilization of a first plurality of threads being executed by one or more processing cores of the plurality of processing cores, wherein the first process is to spawn the first plurality of threads; and determine the utilization of the first process to be a union of the utilization of the first plurality of threads.

Example 6. The apparatus of example 5 or any other example, further comprising: a register to store, corresponding to a first thread of the first plurality of threads, an identifier that is to uniquely identify: the first thread, and the first process that spawns the first thread.

Example 7. The apparatus of example 6 or any other example, wherein the utilization of the first plurality of threads is to be tracked at least in part via the identifier.

Example 8. The apparatus of example 6 or any other example, wherein: the identifier comprises a logical process identifier; and the register comprises an IA32_HWP_Request register.

Example 9. The apparatus of example 1 or any other example, wherein: to select at least one of the operating voltage or the operating frequency of the first processing core, the second circuitry is to select a power state for the first processing core in accordance with the ACPI (Advanced Configuration and Power Interface) specification.

Example 10. The apparatus of example 1 or any other example, wherein: a value of the indicator being higher than a threshold value is to indicate a preference for one of performance or energy efficiency; and a value of the indicator being lower than the threshold value is to indicate a preference for another of performance or energy efficiency.

Example 11. A system comprising: a memory to store instructions for a plurality of processes; a plurality of processor cores to execute the instructions; a wireless interface to facilitate one or more processing cores to communicate with another system; a first circuitry to select an effective utilization of a first processing core to be one of: a utilization of a first process being at least in part executed in the first processing core, or a utilization of the first processing core; and a second circuitry to select one or more operating parameters of the first processing core, based at least in part on the effective utilization of the first processing core.

Example 12. The system of example 11 or any other example, further comprising: a register to store an indicator, wherein the first circuitry is to: in response to the indicator being higher than a threshold, select the effective utilization of the first processing core to be a first one of: the utilization of the first process, or the utilization of the first processing core, and in response to the indicator being lower than the threshold, select the effective utilization of the first processing core to be a second one of: the utilization of the first process, or the utilization of the first processing core.

Example 13. The system of example 11 or any other example, wherein: the indicator comprises at least one of: an energy performance preference field in an IA32_HWP_REQUEST register, or an energy policy preference hint field in an IA32_ENERGY_PEREF_BIAS register.

Example 14. The system of example 11 or any other example, wherein the one or more operating parameters of the first processing core selected by the second circuitry comprises one or more of: an operating voltage of the first processing core, an operating frequency of the first processing core, or a power state for the first processing core that is in accordance with the ACPI (Advanced Configuration and Power Interface) specification.

Example 15. The system of example 11 or any other example, wherein: the first process is to generate a plurality of threads, wherein the first processor core is to execute first one or more threads of the plurality of threads, and a second processing core is to execute second one or more threads of the plurality of threads; and the utilization of the first process is based at least in part on a union of: a utilization of the first one or more threads, and a utilization of the second one or more threads.

Example 16. The system of example 11 or any other example, wherein: the first processing core is to execute a plurality of threads of one or more processes, wherein the one or more processes includes the first process; and the utilization of the first processing core is based on a ratio of: an execution time of the plurality of threads over a specific time period, and the specific time period.

Example 17. An apparatus comprising: a plurality of processor cores grouped into a first group or a second group; a power management circuitry to: assign, to individual processor cores in the first group, a respective voltage and a respective frequency, such that a first processor core of the first group is to be assigned a first voltage and a first frequency, and a second processor core of the second group is to be assigned a second voltage and a second frequency, assign, to each processor core in the second group, a third voltage and a third frequency; and a thread scheduler to assign threads of a first process to be executed by two or more processor cores of the first group, such that threads of the first process are to migrate between the two or more processor cores of the first group and are not to be assigned to any processor core of the second group.

Example 18. The apparatus of example 17 or any other example, wherein the thread scheduler is to assign threads of a second process to be executed by two or more processor cores of the second group, such that threads of the second process are to be migrated between the two or more processor cores of the second group and are not to be assigned to any processor core of the first group.

Example 19. The apparatus of example 18 or any other example, wherein: the thread scheduler is to assign threads of the first process to be executed by the two or more processing cores of the first group, based on an indicator indicating a preference of the threads of the first process for energy efficiency over performance; and the thread scheduler is to assign threads of the second process to be executed by the two or more processing cores of the second group, based on the indicator indicating a preference for performance over energy efficiency.

Example 20. The apparatus of example 17 or any other example, wherein: the third voltage is equal to, or higher than, one or both of the first voltage or the second voltage; and the third frequency is equal to, or higher than, one or both of the first frequency or the second frequency.

An abstract is provided that will allow the reader to ascertain the nature and gist of the technical disclosure. The abstract is submitted with the understanding that it will not be used to limit the scope or meaning of the claims. The following claims are hereby incorporated into the detailed description, with each claim standing on its own as a separate embodiment.

We claim:

1. An apparatus comprising:
   a first processor core and a second processor core of a plurality of processor cores;
   a register to store an indicator related to a process of a plurality of processes, wherein the indicator is to indicate a preference for one of:
   effective core utilization based on a cumulative utilization of a process running on the first processor core and the second processor core; and effective core utilization based on C0 state residency of the first processor core;

a first circuitry to determine effective core utilization of the first processor core, based at least in part on the indicator; and a second circuitry to select at least one of an operating voltage and an operating frequency for the first processor core and hence change a performance of the first processor core, based at least in part on the effective core utilization of the first processor core.

2. The apparatus of claim 1, wherein:

individual processes of the plurality of processes are to spawn corresponding one or more threads, such that the plurality of processes is to spawn a plurality of threads; and the first circuitry is to:

determine a utilization of a first process of the plurality of processes, wherein the first processor core is to at least in part execute the first process, determine a utilization of the first processor core, and determine, as the effective core utilization of the first processor core based at least in part on the indicator, one of: the utilization of the first process and the utilization of the first processor core based at least in part on the indicator.

3. The apparatus of claim 2, wherein to determine the utilization of the first processor core, the first circuitry is to:

track utilization of a one or more threads being executed by the first processor core; and determine the utilization of the first processor core to be a union of the utilization of the one or more threads being executed by the first processor core.

4. The apparatus of claim 2, wherein to determine the utilization of the first process, the first circuitry is to:

track utilization of a first plurality of threads being executed by one or more processor cores of the plurality of processor cores, wherein the first process is to spawn the first plurality of threads; and determine the utilization of the first process to be a union of the utilization of the first plurality of threads.

5. The apparatus of claim 4, wherein the register is to store, corresponding to a first thread of the first plurality of threads, an identifier that is to uniquely identify: the first thread, and the first process that spawns the first thread.

6. The apparatus of claim 5, wherein the utilization of the first plurality of threads is to be tracked at least in part via the identifier.

7. The apparatus of claim 5, wherein:

the identifier comprises a logical process identifier; and the register comprises an IA32_HWP_Request register.

8. The apparatus of claim 1, wherein:

to select at least one of the operating voltage or the operating frequency of the first processor core, the second circuitry is to select a power state for the first processor core in accordance with the ACPI (Advanced Configuration and Power Interface) specification.

9. The apparatus of claim 1, wherein:

a value of the indicator being higher than a threshold value is to indicate a preference for one of a first performance or energy efficiency; and a value of the indicator being lower than the threshold value is to indicate a preference for a second performance or energy efficiency.

10. A system comprising:

a memory to store instructions for a plurality of processes;

a plurality of processor cores to execute the instructions, wherein the plurality of processor cores includes a first processor core and a second processor core;

a wireless interface to facilitate one or more processor cores of the plurality to communicate with another system, wherein the one or more processor cores includes a first processor core and a second processor core;

a register to store an indicator related to a process of a plurality of processes, wherein the indicator is to indicate a preference for one of:

effective core utilization based on a cumulative utilization of a process running on the first processor core and the second process core; and effective core utilization based on C0 state residency of the first processor core;

a first circuitry to determine an effective core utilization of the first processor core, based at least in part on the indicator; and a second circuitry to select one or more operating parameters of the first processor core, based at least in part on the effective core utilization of the first processor core.

11. The system of claim 10, wherein the first circuitry is to:

in response to the indicator being higher than a threshold, select the effective core utilization of the first processor core to be a first one of: the utilization of the process and the utilization of the first processor core, and in response to the indicator being lower than the threshold, select the effective core utilization of the first processor core to be a second one of: the utilization of the process and the utilization of the first processor core.

12. The system of claim 10, wherein:

the indicator comprises at least one of:

an energy performance preference field in an IA32_HWP_REQUEST register, or an energy policy preference hint field in an IA32_ENERGY_PEREF_BIAS register.

13. The system of claim 10, wherein the one or more operating parameters of the first processor core selected by the second circuitry comprises one or more of: an operating voltage of the first processor core, an operating frequency of the first processor core, or a power state for the first processor core that is in accordance with the ACPI (Advanced Configuration and Power Interface) specification.

14. The system of claim 10, wherein:

the process is to generate a plurality of threads, wherein the first processor core is to execute first one or more threads of the plurality of threads, and the second processor core is to execute second one or more threads of the plurality of threads; and the utilization of the process is based at least in part on a union of:

a utilization of the first one or more threads, and a utilization of the second one or more threads.

15. The system of claim 10, wherein:

the first processor core is to execute a plurality of threads of one or more processes, wherein the one or more processes includes the process; and the utilization of the first processor core is based on a ratio of: an execution time of the plurality of threads over a specific time period, and the specific time period.

16. The apparatus of claim 1, wherein the register is a multi-bit register, wherein the indicator stored in the register has a value which is from among a sliding scale of possible values, wherein a value of zero of the indicator corresponds to a highest performance, wherein a maximum value of indicator corresponds to a maximum energy savings.

17. The apparatus of claim 1, wherein the plurality of processor cores is communicatively coupled to an operating system, wherein the operating system is to dynamically change a value of the indicator based on one or more factors.

18. The apparatus of claim 17, wherein the one or more factors include: user input, default configuration, power availability, type of processes executed on the plurality of processor cores, and/or a quality of service of a process.

* * * * *